(12) United States Patent
Sugimoto

(10) Patent No.: US 7,460,144 B2
(45) Date of Patent: Dec. 2, 2008

(54) OPTICAL SCANNING DEVICE AND IMAGE FORMING APPARATUS

(75) Inventor: Tasuku Sugimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 155 days.

(21) Appl. No.: 11/443,322

(22) Filed: May 31, 2006

(65) Prior Publication Data

US 2006/0274140 A1 Dec. 7, 2006

(30) Foreign Application Priority Data

May 31, 2005 (JP) ............................. 2005-159160

(51) Int. Cl.
*B41J 2/435* (2006.01)
*B41J 2/47* (2006.01)

(52) U.S. Cl. ...................................... 347/235; 347/250

(58) Field of Classification Search ................ 347/116, 347/234–236, 248–250, 229
See application file for complete search history.

(56) References Cited

U.S. PATENT DOCUMENTS

| | | | |
|---|---|---|---|
| 4,771,337 A | 9/1988 | Endo et al. | |
| 4,823,151 A * | 4/1989 | Miura | 347/235 |
| 5,943,086 A | 8/1999 | Watabe et al. | |
| 6,064,419 A | 5/2000 | Uchiyama | |
| 6,614,464 B2 * | 9/2003 | Kishida | 347/250 |

FOREIGN PATENT DOCUMENTS

| | | |
|---|---|---|
| JP | 60 244916 | 12/1985 |
| JP | S60-244916 A | 12/1985 |
| JP | 61 125276 | 6/1986 |
| JP | S61-125276 A | 6/1986 |
| JP | 61 159863 | 7/1986 |
| JP | S61-159863 A | 7/1986 |
| JP | 62 145211 | 6/1987 |
| JP | 62 145264 | 6/1987 |
| JP | 62 162549 | 7/1987 |
| JP | 63 175817 | 7/1988 |
| JP | 1988267061 A | 11/1988 |
| JP | 03 223711 | 10/1991 |
| JP | 03 265818 | 11/1991 |
| JP | 04 232767 | 8/1992 |
| JP | 04 240960 | 8/1992 |
| JP | 05 25983 | 2/1993 |
| JP | 05 107493 | 4/1993 |
| JP | 05 69719 | 9/1993 |
| JP | 08 271815 | 10/1996 |
| JP | 08 276617 | 10/1996 |
| JP | 10 311959 | 11/1998 |
| JP | 2001 255476 | 9/2001 |
| JP | 2002 3339752 | 8/2002 |
| JP | 2002 365569 | 12/2002 |
| JP | 2004 85788 | 3/2004 |

* cited by examiner

*Primary Examiner*—Hai C Pham
(74) *Attorney, Agent, or Firm*—Baker Botts L.L.P.

(57) ABSTRACT

An optical scanning device that includes: a light-emitting unit that emits laser light to a polygon mirror on the basis of a turning-on signal; a sensor unit that detects laser light reflected by the polygon mirror and outputs a sensor signal; and a noise removing unit that outputs a laser light detection signal when the sensor signal is output during an output period of the turning-on signal.

18 Claims, 11 Drawing Sheets

OPTICAL SCANNING DEVICE AND IMAGE FORMING APPARATUS

CROSS REFERENCE TO RELATED APPLICATION

This application claims priority from Japanese Patent Application No. 2005-159160, filed on May 31, 2005, the entire subject matter of which is incorporated herein by reference.

TECHNICAL FIELD

Aspects of the present invention relate to an optical scanning device and an image forming apparatus.

BACKGROUND

Conventionally, there is proposed an optical scanning device that has a BD (Beam Detector) sensor for detecting laser light scanned by a polygon mirror to output a BD signal. This optical scanning device controls a writing timing of laser light by using the BD signal. For example, in a technology disclosed in JP-A-4-240960, there is provided a unit that generates and outputs a signal indicating one of an immediate pre-image formation region (state A), an image formation region (state B), an immediate post-image formation region (state C), and a BD signal detection region (state D). In this technology, only the BD signal detected at the time of the state D is used as a normal BD signal.

SUMMARY

According to the above-described technology, it is possible to remove an abnormal signal generated in a region other than the state D, and to increase accuracy of the BD signal to some extent. However, in this technology, the region where the BD signal is effective is set as a rough region such as the state D (the BD signal detection region). Thus, when the abnormal BD signal is generated in the state D, this signal is erroneously used as a normal signal.

Aspects of the present invention provide an optical scanning device that can remove an abnormal sensor signal with high accuracy, without using a complicated configuration and can obtain a highly-reliable laser light detection signal.

According to an aspect of the invention, there is provided an optical scanning device including: a light-emitting unit that emits laser light to a polygon mirror on the basis of a turning-on signal; a sensor unit that detects laser light reflected by the polygon mirror and outputs a sensor signal; and a noise removing unit that outputs a laser light detection signal when the sensor signal is output during an output period of the turning-on signal.

According to another aspect of the invention, there is provided an image forming apparatus having an optical scanning device including: a light-emitting unit that emits laser light to a polygon mirror on the basis of a turning-on signal; a sensor unit that detects laser light reflected by the polygon mirror and outputs a sensor signal; and a noise removing unit that outputs a laser light detection signal when the sensor signal is output during an output period of the turning-on signal.

According to the above-described aspect, even when an erroneous sensor signal is output, the laser light detection signal is not output when the turning-on signal is not output. Therefore, it is possible to remove an abnormal sensor signal (noise) with high accuracy, without using a complicated configuration. As a result, a highly reliable laser light detection signal can be obtained.

DETAILED DESCRIPTION

<First Aspect>

A first aspect of the invention will be described with reference to the drawings.

Figure 1:
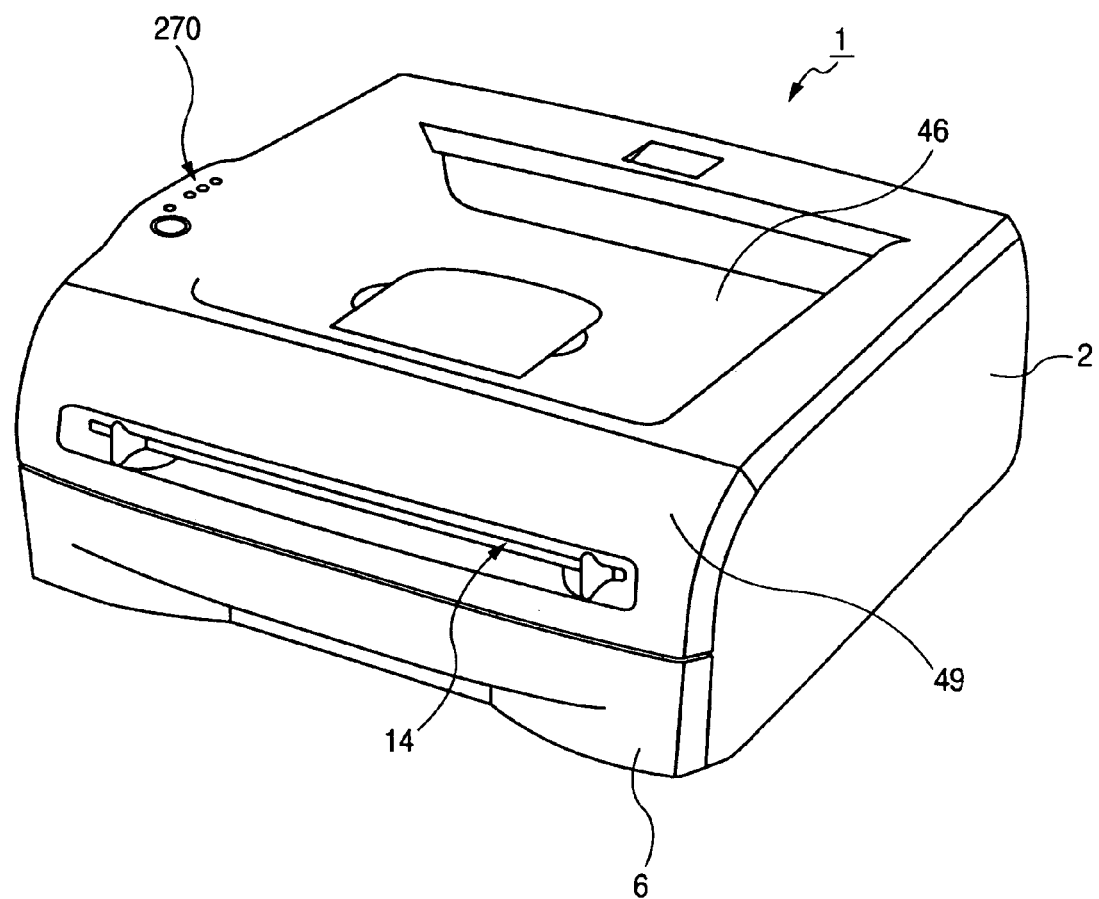
FIG. 1 is a perspective view showing a laser printer according to a first aspect of the invention.
Figure 2:
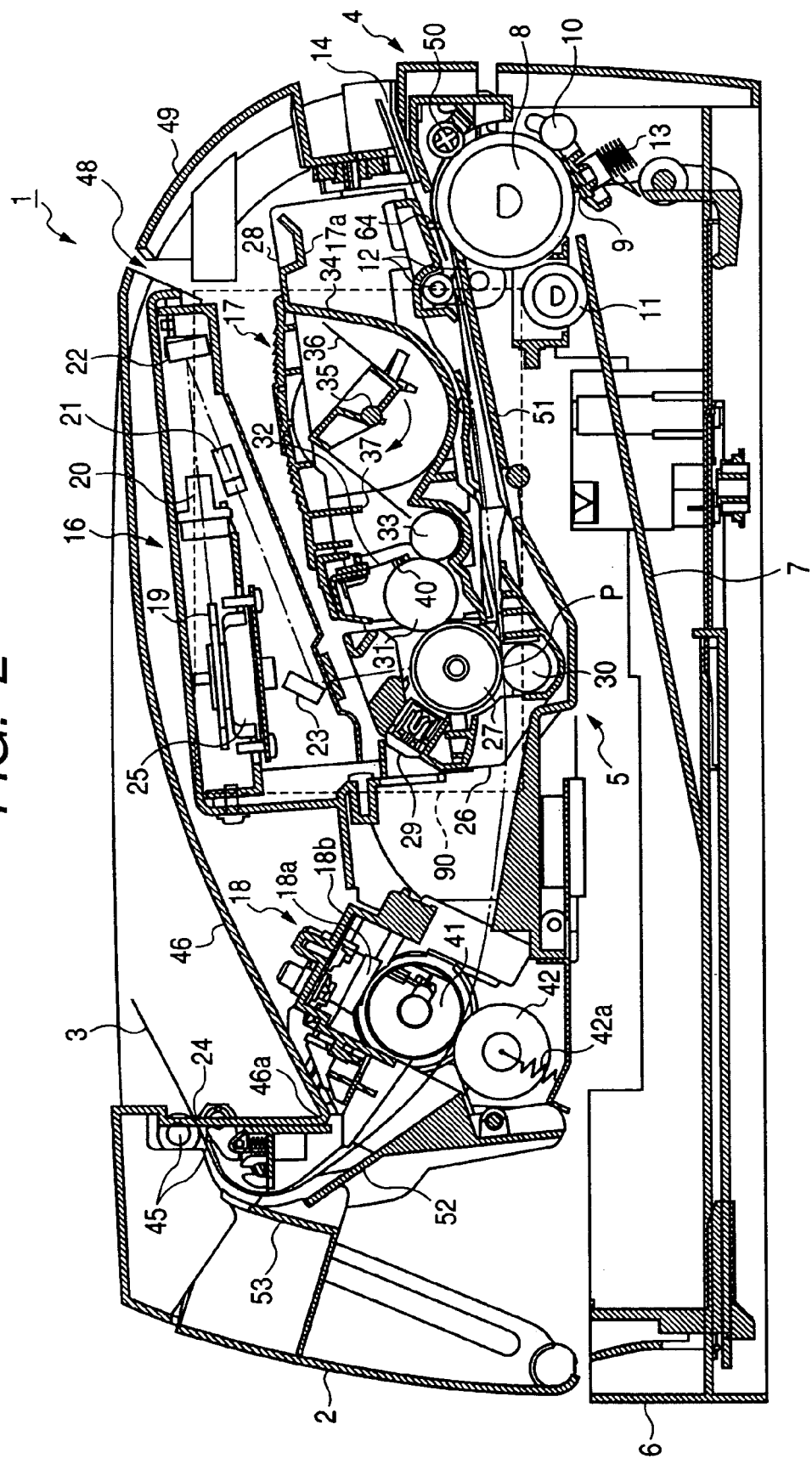
FIG. 2 is a schematic side cross-sectional view of the laser printer of the first aspect.

First, the overall configuration will be described with reference to FIGS. 1 and 2. FIG. 1 is a perspective view showing a laser printer 1 (hereinafter, simply referred to as printer 1), which is an example of an image forming apparatus. FIG. 2 is a side cross-sectional view showing the printer 1. Incidentally, FIG. 2 is a diagram of the printer 1 as viewed from the axial direction of various rollers. In FIG. 2, a right side is referred to as a front side, and a left side is referred to as a rear side.

1. Overall Configuration

As shown in FIG. 1, the printer 1 is provided with a main body casing 2. Inside the main body casing 2, as shown in FIG. 2, a feeder section 4 for supplying a sheet 3, an image forming section 5 for forming a predetermined image on the fed sheet 3, and the like are provided. Further, as shown in FIGS. 1 and 2, at an upper portion of the printer 1, there is provided a sheet discharge tray 46 used to hold the discharged sheet 3 on which the image is formed by the printer 1.

On one side wall of the main body casing 2, there are provided an opening 48 for inserting and removing a process unit 17 that will be described below, and a front cover 49 for opening and closing the opening 48. The front cover 49 is rotatably supported on a cover shaft (not shown) inserted into its lower end portion.

When the front cover 49 is closed about the cover shaft, as shown in FIGS. 1 and 2, the opening 48 is closed by the front cover 49. When the front cover 49 is opened (inclined) with the cover shaft as a fulcrum, the opening 48 is opened such that the process unit 17 can be inserted into and removed from the main body casing 2 via the opening 48.

As shown in FIG. 2, the feeder section 4 has a sheet supply tray 6, a sheet urging plate 7 provided inside the sheet supply tray 6, a pick-up roller 11 provided above one end portion of the sheet supply tray 6, a sheet supply roller 8, a separation pad 9, a pinch roller 10 opposing the sheet supply roller 8, a paper dust removing roller 50, and a registration roller 12 provided on a downstream side in a conveyance direction of the sheet 3 with respect to the paper dust removing roller 50.

The sheet supply tray 6 is removably mounted in the bottom of the main body casing 2 to stack and house the sheets 3 therein. For the supply of the sheets 3, the sheet supply tray 6 is drawn out to the front side of the printer 1 (the right side in FIG. 2). At this time, the feeder section 4 is separated between the sheet supply roller 8 and the separation pad 9. The pinch roller 10, the separation pad 9, and a spring 13 disposed on the back side of the separation pad 9 are drawn out, together with the sheet supply tray 6.

The sheet urging plate 7 is pivotably supported at an end portion thereof distant from the sheet supply roller 8. Another end portion of the sheet urging plate 7 close to the sheet supply roller 8 is movable up and down and is urged upward by a spring (not shown). With this configuration, as the stack amount of the sheets 3 increases, the sheet urging plate 7 pivots downward against urging force of the spring with the end portion distant from the sheet supply roller 8 as a fulcrum.

The pick-up roller 11 is set to come into contact with the uppermost sheet 3 stacked in the sheet supply tray 6 on the sheet urging plate 7. The sheet 3 is sent to a conveyance position (a position between the sheet supply roller 8 and the separation pad 9) at which the sheet 3 can be conveyed by the sheet supply roller 8.

The separation pad 9 is provided at a position opposing the sheet supply roller 8. The separation pad 9 is pressed toward the sheet supply roller 8 by the spring 13 provided on the backside of the separation pad 9. The separation pad 9 has a function of preventing plural piled sheets 3 from being supplied into the conveyance path.

The sheet 3 supplied by the sheet supply roller 8 is sent to the conveyance path of the sheet 3 (see a two-dot-chain line of FIG. 2). At this time, paper dust is removed by the paper dust removing roller 50, and then the sheet 3 is sent to the registration roller 12. Over the entire portion from an upper end of the sheet supply roller 8 to an image formation position P, the conveyance path is inclined downward from the horizontal direction. Further, the most portion of the conveyance path from the sheet supply roller 8 to the image formation position P is formed by a guide member 51 formed in the main body of the printer 1 and a bottom portion of the process unit 17.

The registration roller 12 has a pair of rollers. The drive and stop operations of the registration roller 12 is controlled by a control device (not shown) disposed on a circuit board 90, which will be described later, on the basis of a detection timing by a position sensor 64 disposed close to the sheet supply roller 8. With this control, the skew of the sheet 3 is corrected. That is, the control device drives the registration roller 12 when the sheet 3 is conveyed by the sheet supply roller 8, and stops the registration roller 12 when the position sensor 64 in front of the registration roller 12 detects the leading end of the sheet 3. Then, when the sheet 3 comes into contact with the registration roller 12 and is slack, the control device drives the registration roller 12 again to convey the sheet 3 to the image forming section 5.

The position sensor 64 is a mechanical type. When coming into contact with and being pressed by the sheet 3, the position sensor 64 is displaced from a predetermined position.

Further, above the sheet supply roller 8, a manual sheet supply opening 14 for directly supplying the sheet 3 from the front side of the printer 1 to a position of the registration roller 12 is formed. Accordingly, the sheet 3 can be supplied to the conveyance path, without being housed in the sheet supply tray 6.

The image forming section 5 has a scanner unit 16, a process unit 17, and a fixing unit 18.

The scanner unit 16 is provided at an upper portion in the main body casing 2. The scanner unit 16 has a laser diode 101 (see FIG. 3) serving as a light-emitting unit, a polygon mirror 19 that rotates by a scanner motor 25, lenses 20 and 21, reflecting mirrors 22 and 23, and the like. A laser beam based on predetermined image data emitted from the laser diode 101 sequentially passes through or is reflected by the polygon mirror 19, the lens 20, the reflecting mirror 22, the lens 21, and the reflecting mirror 23, as shown in a one-dot-chain line in FIG. 2, and then is irradiated by high-speed scanning onto the surface of a photosensitive drum 27 in the process unit 17 described below.

More specifically, in the scanner unit 16, the polygon mirror 19 is disposed right above the photosensitive drum 27 and the image formation position P. The laser beam reflected by the polygon mirror 19 substantially travels toward the reflecting mirror 22 in a horizontal direction. And then, the laser beam is reflected by the reflecting mirror 22 toward the reflecting mirror 23 located immediately below the polygon mirror 19. That is, the reflecting mirror 22 reflects the incident laser beam at an acute angle of about 15 degrees downward with respect to the horizontal direction. Further, the scanner unit 16 having these individual parts (the polygon mirror 19, the lenses 20 and 21, and the reflecting mirrors 22 and 23) is configured to have the size and shape not disturbing the optical path of the laser beam.

The process unit 17 is provided below the scanner unit 16. The process unit 17 is removable from and attachable to the main body casing 2 in substantially the horizontal direction and in the front and rear direction (in FIG. 2, the left and right direction: installation direction). The process unit 17 has a drum cartridge 26 and a developing cartridge 28. Further, a space is formed between the process unit 17 and the scanner unit 16.

The drum cartridge 26 of the process unit 17 has the photosensitive drum 27, a Scorotron type charger 29, and a transfer roller 30.

The developing cartridge 28 has a developing roller 31, a layer-thickness regulating blade 32, a toner supply roller 33, a toner box 34, and the like. The developing cartridge 28 is removably mounted on the drum cartridge 26.

Further, a toner (developer) is filled in the toner box 34. The toner in the toner box 34 is agitated by the rotation of an agitator 36 supported by a rotational shaft 35 provided at the center of the toner box 34 in an arrow direction (clockwise direction), and then is discharged from a toner supply opening 37 provided in the toner box 34.

The toner supply roller 33 is provided to rotate in a counterclockwise direction at a lateral position of the toner supply opening 37. Further, the developing roller 31 is provided to face the toner supply roller 33 and to rotate in the counterclockwise direction. The toner supply roller 33 and the developing roller 31 come into contact with each other to individually compress each other to some degree.

The toner supply roller 33 has a metal roller shaft covered with a roller formed of a conductive foaming material. The developing roller 31 has a metal roller shaft is covered with a roller formed of a conductive rubber material not having magnetic characteristics. More specifically, in the roller part of the developing roller 31, a surface of a roller main body formed of conductive urethane rubber or silicon rubber containing carbon particle is covered with a coat layer of urethane rubber or silicon rubber containing fluorine. Moreover, a developing bias is applied to the developing roller 31.

Further, in the vicinity of the developing roller 31, the layer-thickness regulating blade 32 is provided. The layer-thickness regulating blade 32 has a pressing portion 40 formed of insulating silicon rubber having a semicircle section at the tip end of a blade main body formed of a metal leaf spring member. The layer-thickness regulating blade 32 is supported by the developing cartridge 28 in the periphery of the developing roller 31 such that the pressing portion 40 is brought into pressure contact with the developing roller 31 by elastic force of the blade main body.

The toner discharged from the toner supply opening 37 is supplied to the developing roller 31 by the rotation of the toner supply roller 33. At this time, frictional charging is positively promoted between the toner supply roller 33 and the developing roller 31. And then, the toner supplied onto the developing roller 31 enters between the pressing portion 40 of the layer-thickness regulating blade 32 and the developing roller 31 according to the rotation of the developing roller 31. The toner is sufficiently frictionally charged and then is carried on the developing roller 31 as a thin layer having a predetermined thickness.

The photosensitive drum 27 is provided to rotate in the clockwise direction at the lateral position of the developing roller 31 while facing the developing roller 31. In the photosensitive drum 27, a drum main body is grounded, and its surface portion is formed of a positive charging photosensitive layer such as polycarbonate or the like. The photosensitive drum 27 is configured to rotate by power from a main motor 118 described below.

The Scorotron type charger 29 is provided at a predetermined gap from the photosensitive drum 27 so as not to come into contact with the photosensitive drum 27. The Scorotron type charger 29 is disposed at about 30 degrees above the horizontal direction in a radial direction of the photosensitive drum 27. Further, the Scorotron type charger 29 is a positive charging Scorotron type charger that generates corona discharge from a charging wire such as tungsten or the like. The Scorotron type charger 29 is so configured as to uniformly charge the surface of the photosensitive drum 27 to the positive polarity.

The surface of the photosensitive drum 27 is uniformly positively-charged by the Scorotron type charger 29 according to the rotation of the photosensitive drum 27. The surface is then exposed by high-speed scanning of the laser beam from the scanner unit 16, thereby forming an electrostatic latent image based on predetermined image data.

Subsequently, the toner carried on the developing roller 31 and is positively-charged comes into contact with the photosensitive drum 27 by the rotation of the developing roller 31. And then, the toner is supplied to the electrostatic latent image formed on the surface of the photosensitive drum 27, that is, an exposed portion, which is exposed by the laser beam and whose electric potential is lowered, in the surface of the photosensitive drum 27 uniformly positively-charged. The toner is selectively carried, thereby being turned into a visible image. Accordingly, reversal development is achieved.

The transfer roller 30 is disposed below the photosensitive drum 27 to face the photosensitive drum 27. The transfer roller 30 is supported by the drum cartridge 26 to rotate in the counterclockwise direction. In the transfer roller 30, a metal roller shaft is covered with a roller formed of an ion-conductive rubber material. At the time of the transfer, a transfer bias (transfer forward bias) is applied to the transfer roller 30. Thus, the visual image carried on the surface of the photosensitive drum 27 is transferred to the sheet 3 when the sheet 3 passes through between the photosensitive drum 27 and the transfer roller 30 (the image formation position P).

The fixing unit 18 is provided on a downstream side in the sheet conveyance direction (the rear side) of the process unit 17. The fixing unit 18 has a heating roller 41 provided with gears, a pressing roller 42 for pressing the heating roller 41, and a thermostat 18a. The heating roller 41 and the thermostat 18a are covered with a cover 18b.

The heating roller 41, formed of a metal, has a halogen lamp for heating.

A spring 42a is provided below the pressing roller 42 to press (bias) the pressing roller 42 toward the center axis of the heating roller 41 from the bottom in a rotatable manner. Further, the pressing roller 42 is so configured as to rotate in synchronization with the heating roller 41 in close contact with the heating roller 41 or the sheet 3.

Further, the thermostat 18a is disposed above the heating roller 41 along an extension line (virtual line) including the rotational center lines of the pressing roller 42 and the heating roller 41. This arrangement makes it easier to configure such that a concave portion 46a of a sheet discharge tray 46 is disposed at a lower position, as compared with when the thermostat 18a is disposed immediately above the heating roller 41 or when the thermostat 18a is disposed on the rear side from a position immediately above the heating roller 41 (in FIG. 2, the left side: the downstream side in the conveyance direction of the sheet 3).

In such a fixing unit 18, the heating roller 41 fixes the toner transferred on the sheet 3 by the process unit 17 onto the sheet 3 by heating and pressing the sheet 3 when the sheet 3 passes through between the heating roller 41 and the pressing roller 42. Further, the heating roller 41 conveys the image-fixed sheet 3 to sheet discharge rollers 45 through a sheet discharge path formed with guide members 52 and 53. And then, the sheet discharge rollers 45 discharges the conveyed sheets 3 onto the sheet discharge tray 46. The pair of sheet discharge rollers 45 function as an outlet 24 for allowing the sheet 3 to be discharged outside the printer 1.

In the printer 1, as shown in a broken line in FIG. 2, the circuit board 90, on which a control device for performing drive control of various rollers, the polygon mirror 19, and the like are mounted, is disposed on at least one of both sides of the conveyance path of the sheet 3 (these sides are located so as to laterally interpose the process unit 17).

2. Motor Driving Device

Figure 3:
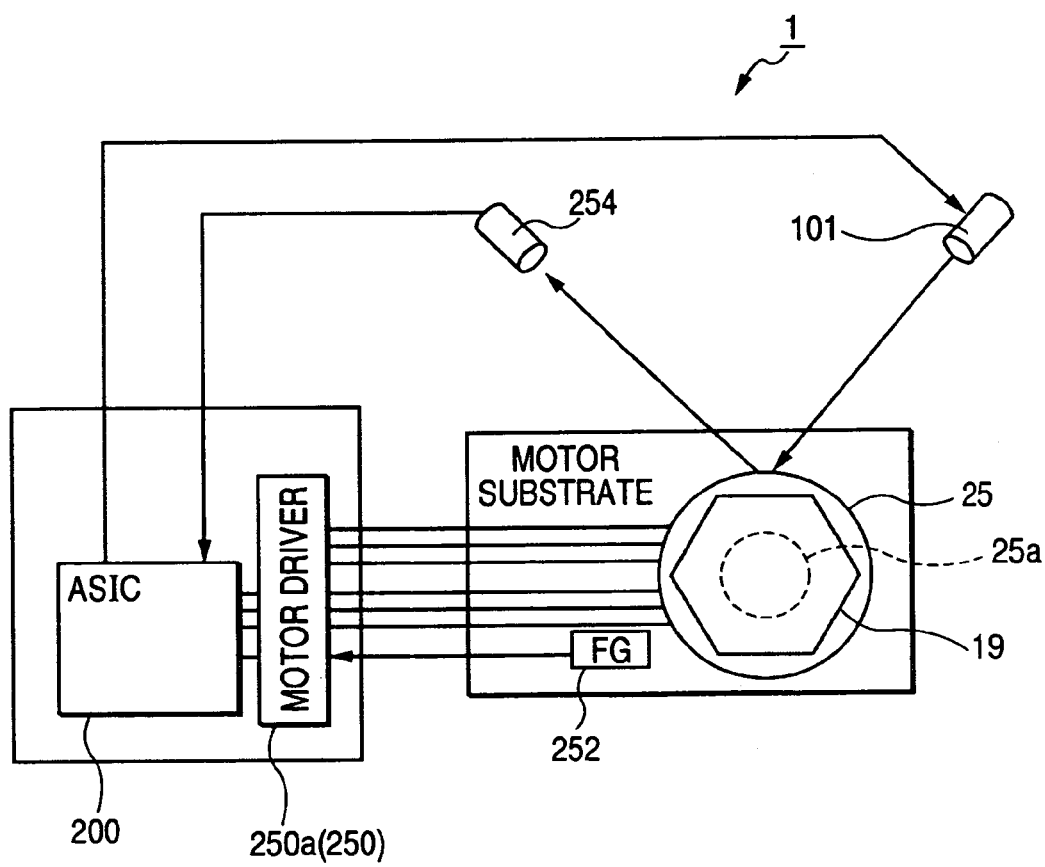
FIG. 3 is an explanatory view conceptually illustrating the configuration for detecting a periodic signal in a scanner motor according to the first aspect.
Figure 4:
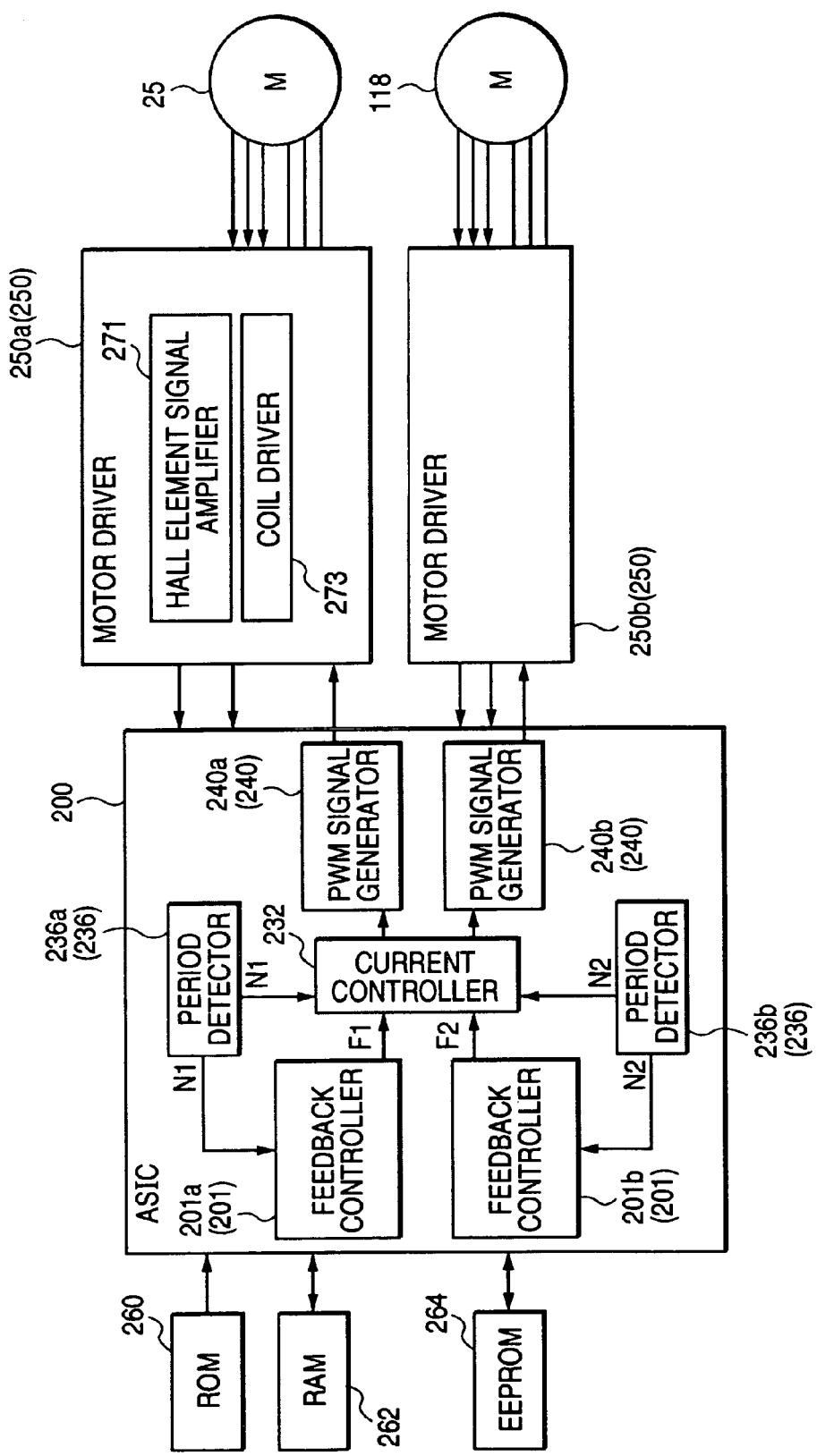
FIG. 4 is a block diagram conceptually showing the configuration of a motor driving device according to the first aspect.
Figure 5:
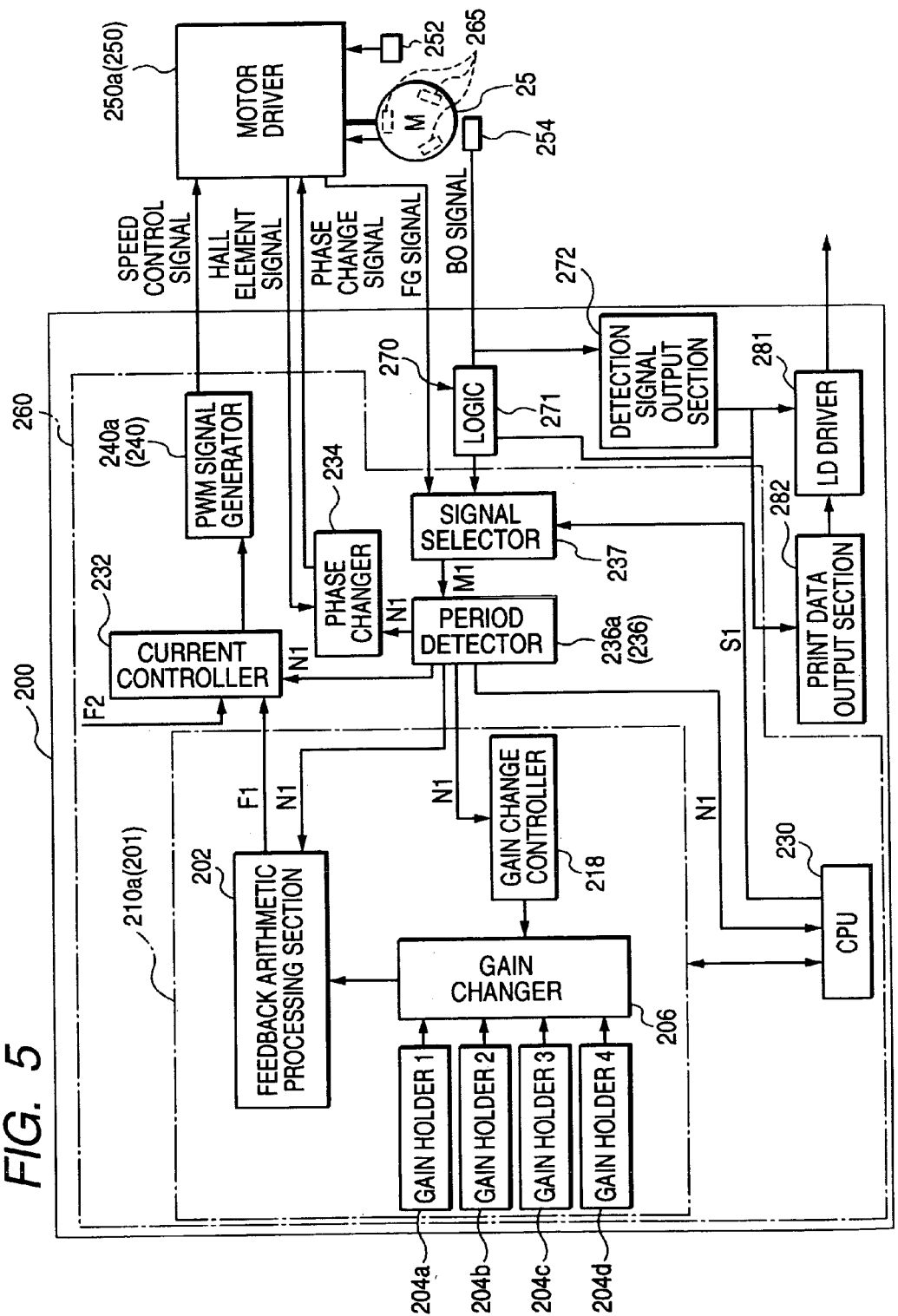
FIG. 5 is an explanatory view primarily illustrating a section of the motor driving device, which drives the scanner motor.

Next, a motor driving device for driving the scanner motor 25 will be described. FIG. 3 is an explanatory view conceptually illustrating the outline of the motor driving device. FIG. 4 is an explanatory view illustrating the overall configuration of the motor driving device. FIG. 5 is an explanatory view illustrating a section of the motor driving device, which drives the scanner motor 25.

As shown in FIG. 3, the laser printer 1 is provided with the polygon mirror 19 and the scanner motor 25. In addition, the laser printer 1 has a beam detector (hereinafter, simply referred to as 'BD') sensor 254 that detects laser light reflected by the polygon mirror 19 and outputs a BD signal corresponding to a scanning period of laser light, and a frequency generator (hereinafter, simply referred to as 'FG') signal generator 252 that detects a rotor 25a in conjunction with the rotation of the scanner motor 25 and outputs an FG signal corresponding to a rotation period of the polygon mirror 19. The BD signal output from the BD sensor 254 and the FG signal output from the FG signal generator 252 are input to an ASIC (Application Specific Integrated Circuit) 200, and the ASIC 200 performs speed control of the scanner motor 25. Incidentally, the BD sensor 254 functions as a sensor unit.

As shown in FIGS. 3 and 4, a motor driver 250a corresponding to the scanner motor 25 is connected to the ASIC 200. Further, as shown in FIG. 4, a motor driver 250b corresponding to a main motor 118 described below is connected to the ASIC 200. As shown in FIG. 3, the ASIC 200 and the motor driver 250a are provided on different circuit boards. In FIG. 3, the motor driver 250b (FIG. 4) for the main motor 118 (FIG. 4) is omitted. The ASIC 200 is so configured as to allow input/output of a digital signal and to perform digital processing. In this aspect, the motor driver 250a and the motor driver 250b are collectively referred to as 'motor driver 250'.

The motor drivers 250a and 250b shown in FIG. 4 are so configured as to drive the scanner motor 25 and the main motor 118, respectively, on the basis of digital signals output from the ASIC 200. Further, there is provided inside the ASIC 200, a CPU 230 as shown in FIG. 5. There are provided, outside the ASIC 200, memory devices including a ROM 260, a RAM 262, an EEPROM 264, and the like, with the ASIC 200 being connected to the memory devices.

Further, as shown in FIG. 4, period detectors 236a and 236b, feedback controllers 201a and 201b, and PWM signal generators 240a and 240b corresponding to each of the motors are provided in the ASIC 200. Incidentally, the period detectors 236a and 236b are collectively referred to as 'period detector 236', and the feedback controllers 201a and 201b are collectively referred to as 'feedback controller 201'. Further, the PWM signal generators 240a and 240b are collectively referred to as 'PWM signal generator 240'. FIG. 5 shows the period detector 236a, the feedback controller 201a, the PWM signal generator 240a, a phase changer 234, and the like corresponding to the scanner motor 25. There are similarly provided for the main motor 118 the period detector (not shown), a phase changer (not shown), the feedback controller 201b (see FIG. 4), and the PWM signal generator 240b (FIG. 4).

As shown in FIG. 5, the scanner motor 25 is provided with the above-described FG signal generator 252. The period detector 236a is so configured as to detect the rotation period of the scanner motor 25 by the FG signal corresponding to the rotation period of the polygon mirror 19, which is generated by the FG signal generator 252.

The FG signal generator 252, which has an FG pattern patterned on the circuit board, is so configured as to detect the rotor 25a (FIG. 3) of the scanner motor 25. Specifically, a magnet is provided on a circuit board side of the rotor, and the FG signal is generated, which is a waveform corresponding to the rotation period, by the FG pattern and the magnet. The generated FG signal is input to the motor driver 250a. The motor driver 250a is so configured as to amplify the FG signal from the FG signal generator 252 and to convert the amplified signal to a digital signal. The amplified and analog-to-digital converted FG signal is output from the motor driver 250a to the ASIC 200. In the ASIC 200, the FG signal is input to the period detector 236a via a signal selector 237 described below. The period detector 236a is so configured as to detect the rotation period of the scanner motor 25 based on the FG signal.

Further, the scanner motor 25 uses not only the FG signal generator 252, but also the above-described BD sensor 254, each of which functions as a periodic signal output unit.

The BD sensor 254 is so configured as to detect the signal according to the rotation of the scanner motor 25. Specifically, the BD sensor 254 is so configured as to detect reflected light when the angle of the polygon mirror 19 (FIG. 3) satisfies predetermined conditions. As shown in FIG. 3, in a case where the polygon mirror 19 has six facets, reflected light is detected six times each time the polygon mirror 19 rotates. And then, the output according to the detection of reflected light, which serves as the BD signal having a waveform corresponding to the rotation period, is output to the ASIC 200. As shown in FIG. 5, the ASIC 200 is so configured as to input a laser light detection signal C (described below), from which noise is removed by a noise removing section 270, to the period detector 236a through the signal selector 237. The period detector 236a is so configured as to detect the rotation period of the scanner motor 25 based on the laser light detection signal C. Incidentally, the BD signal may be input to the motor driver 250a, and then may be input to the ASIC 200 through the motor driver 250a after being converted into a digital signal at the motor driver 250a.

As described above, the FG signal and the BD signal are input to the ASIC 200, and the ASIC 200 is so configured as to use one of the FG and BD signals by the signal selector 237 described below. In the ASIC 200, the speed control of the scanner motor 25 is performed based on the selected signal.

A selection signal S1 is output from the CPU 230 to the signal selector 237 according to a selection condition. The signal selector selects one of the FG signal and the laser light detection signal C based on the selection signal S1. Specifically, the selection signal S1 is output from the CPU 230 depending on the rotation speed of the scanner motor 25 such that the FG signal is used when the rotation speed is low and the laser light detection signal C obtained by removing noise from the BD signal is used when the rotation speed is high. The result detected by the period detector 236a is input to the phase changer 234, a current controller 232, a feedback processing section 202, a gain change controller 218, and the CPU 230 as a signal N1. This allows the phase changer 234, the current controller 232, the feedback processing section 202, the gain change controller 218, and the CPU 230 to monitor the period.

Further, as shown in FIG. 5, the scanner motor 25 is provided with three Hall elements 256, each of which generates an output dependent on the position of the rotor 25a (FIG. 3) of the scanner motor 25. The output from each of the Hall elements 256 is input to the motor driver 250a. In the motor driver 250a, the output from each of the Hall elements 256 is amplified by a Hall-element signal amplifier 271 (see FIG. 4) and is converted into a digital signal by an A/D converter (not shown). And then, the digitized Hall-element signals are output to the ASIC 200.

The Hall-element signal is a waveform signal usable for identifying the rotation position of the rotor 25a (FIG. 3) of the scanner motor 25. When the Hall-element signals are input to the ASIC 200 through the motor driver 250a, the ASIC 200 monitors the rotation position (the relative rotation position of the rotor 25a (FIG. 3) to a stator) of the rotor 25a (FIG. 3).

Further, as shown in FIG. 5, the ASIC 200 determines a phase-change timing of the scanner motor 25, while monitoring the position of the rotor 25a (FIG. 3), based on the input Hall-element signals. At the determined phase-change timing, the ASIC 200 outputs a phase-change signal in the form of a digital signal to the motor driver 250a for driving the scanner motor 25.

The scanner motor 25 in the form of a three-phase motor includes coils in a three-phase star connection (not shown).

The three Hall elements 256, which are evenly spaced apart around the rotor 25a of the scanner motor 25 (for example, at intervals of 120 degrees), input the Hall-element signals to the ASIC 200. The phase changer 234, once detects one of the rising and falling edges of the Hall-element signals, generates and outputs the phase-change signal to cause current to flow in the coils of the U-, V-, and W-phases of the scanner motor 25 such that the coils are excited at two of these phases in opposite in polarity to each other.

Further, as shown in FIGS. 4 and 5, the ASIC 200 is provided with the feedback controller 201. As shown in FIG. 4, the feedback controller 201 includes the feedback controller 201a corresponding to the scanner motor 25 and the feedback controller 201b corresponding to the main motor 118. The feedback controllers 201a and 201b, both of which are approximately common in configuration to each other, are so configured as to calculate control values (speed command values) F1 and F2 corresponding to the motors 25 and 118. Now, the configuration of the feedback controller 201 will be described with reference to FIG. 5, by way of example of the feedback controller 201a corresponding to the scanner motor 25.

As shown in FIG. 5, the feedback controller 201a has a gain changer 206, the gain change controller 218, and the feedback processing section 202. The gain change controller 218 outputs a selection command depending on a predetermined condition to the gain changer 206, and the gain changer 206 selects a gain from one of a plurality of gain holders 204a, 204b, 204c, and 204d according to the selection command. The gain holders 204a, 204b, 204c, and 204d hold the set values of gains in a selectable manner, and the set value set in one of the gain holders 204a, 204b, 204c, and 204d is selected by the gain changer 206.

The gain change controller 218 is so configured as to output the selection command for selecting one of the gains to the gain changer 206 based on the rotation state of the scanner motor 25. Specifically, when the scanner motor 25 starts rotating from a stationary state, the gain changer controller 218 outputs such a selection command as to select a gain for activation until the scanner motor 25 enters a predetermined steady state. After the scanner motor 25 enters the predetermined steady state, the gain change controller 218 outputs such a selection command to select a gain for steady state, which is different from the gain for activation.

Figure 6:
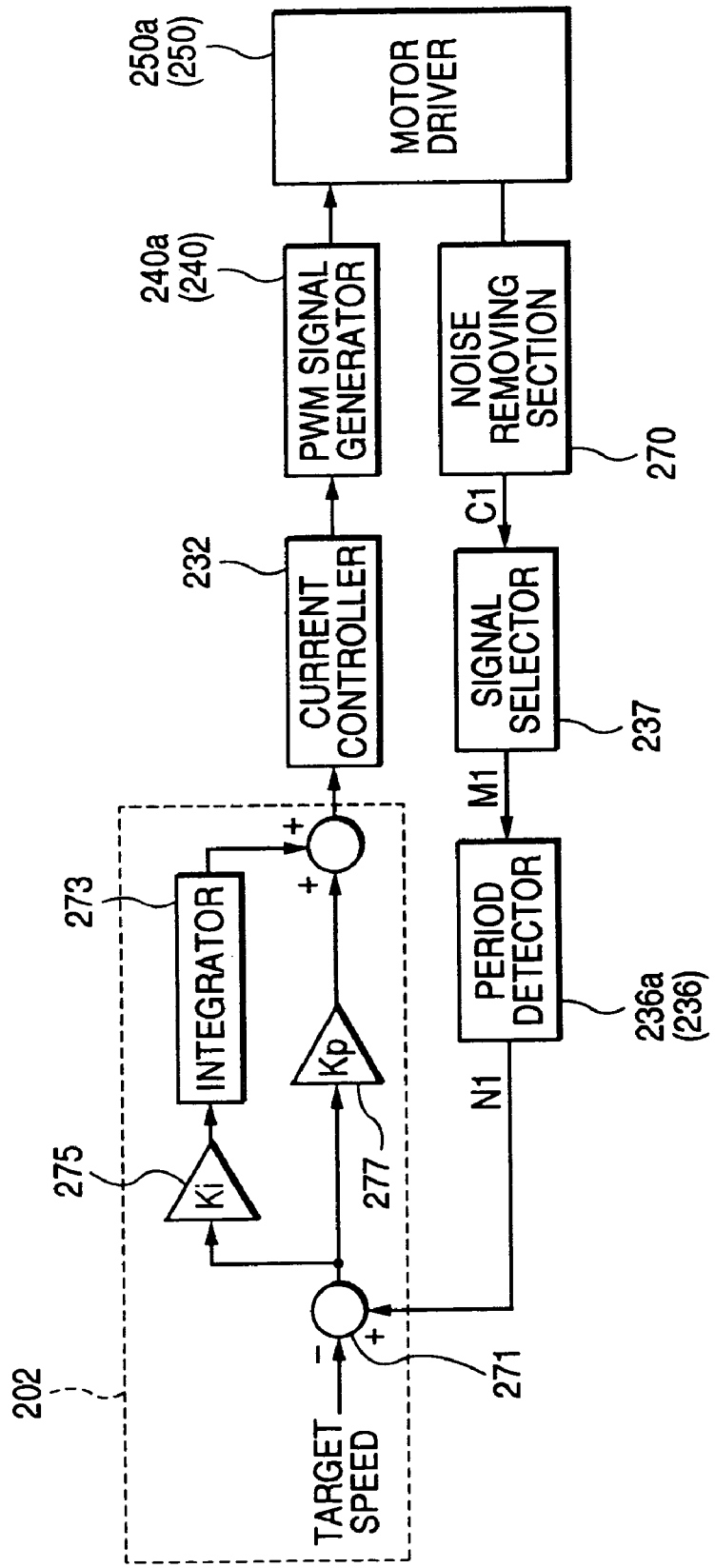
FIG. 6 is an explanatory view illustrating the internal configuration of a feedback controller and a connecting portion.

FIG. 6 conceptually shows the internal configuration of the feedback processing section 202 and the connections thereof with other components. The feedback processing section 202 determines the control value (speed command value) of the scanner motor 25 based on the gain selected by the gain changer 206 and the current rotation speed of the scanner motor 25 detected by the period detector 236a (the rotation speed calculated based on one of the laser light detection signal C and the FG signal).

In this aspect, the feedback processing section 202 includes a subtracter 271, which calculates a difference between the current rotation speed detected by the period detector 236 and a target speed. The feedback processing section 202 further includes a multiplier 275 that multiples the difference by an integral gain, and an integrator 273 that obtains an integrated value of values calculated by the multiplier 275, thereby calculating an integral control value. The feedback processing section 202 further includes a multiplier 277, which multiples a speed difference by a proportional gain, thereby calculating a proportional control value. The feedback processing section 202 sums up the integral control value and the proportional control value to thereby obtain the control value (speed command value). The control value (speed command value) is input to the current controller 232 described below. Incidentally, the proportional gain used in the multiplier 277 and the integral gain used in the multiplier 275 are selected by the above-described gain changer 206. A proportional gain for activation, a proportional gain for steady state, an integral gain for activation, and an integral gain for steady state are used according to the states.

The calculated control value (speed command value) is input to the current controller 232, and a control is imposed according to conditions. The current controller 232 calculates current values A2 and B2 to be supplied to the scanner motor 25 and the main motor 118, respectively. The current controller 232 performs control of the supply current (specifically, control of the speed command value output to each PWM signal generator) such that the total current value E, the sum of the current values A2 and B2, is not greater than a maximum supply current value D from a power source. For example, when a large current is supplied to the scanner motor 25 (for example, a period after the scanner motor 25 starts), the control is imposed such that the current value B2 to be supplied to the main motor 118 becomes smaller than a maximum current value B1 that is supplied to the main motor 118.

The speed command value is then input to the PWM signal generator 240a. The PWM signal generator 240a generates a PWM signal based on the speed command value or a PWM signal based on the speed command value controlled by the current controller 232. And then, the PWM signal is output to the motor driver 250a as a speed control signal (in the form of a digital signal). The motor driver 250a drives the scanner motor 25 according to the PWM signal (speed control signal).

3. Configuration for Removing Noise

Next, the configuration for removing noise will be described.

Figure 7:
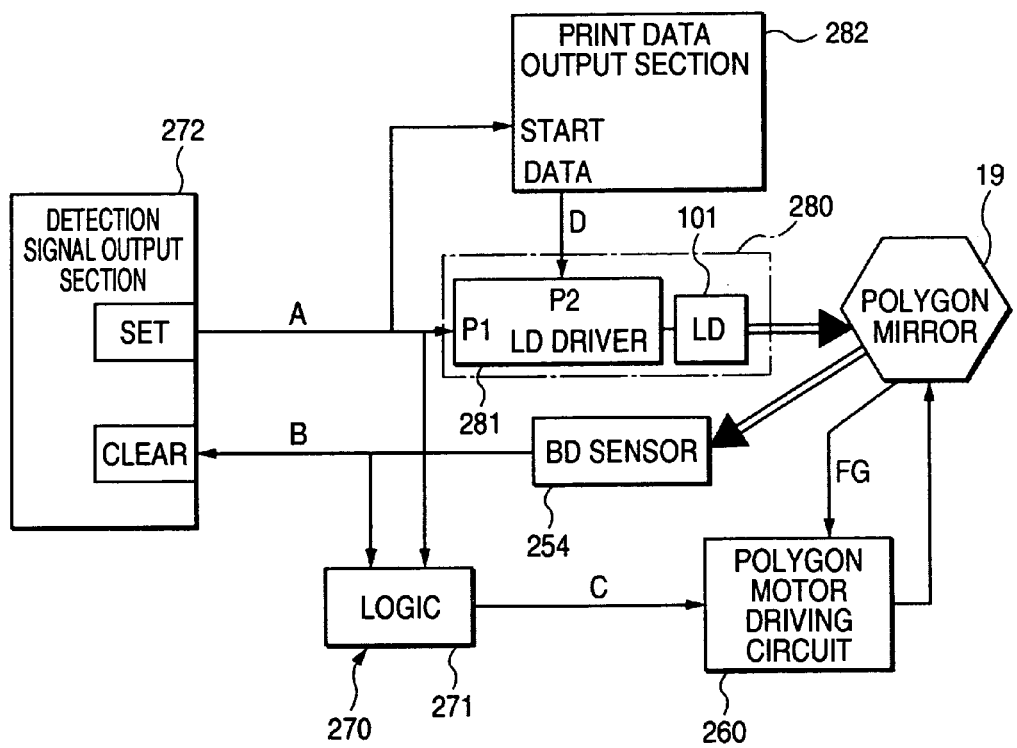
FIG. 7 is an explanatory view illustrating the configuration for removing noise.
Figure 8:
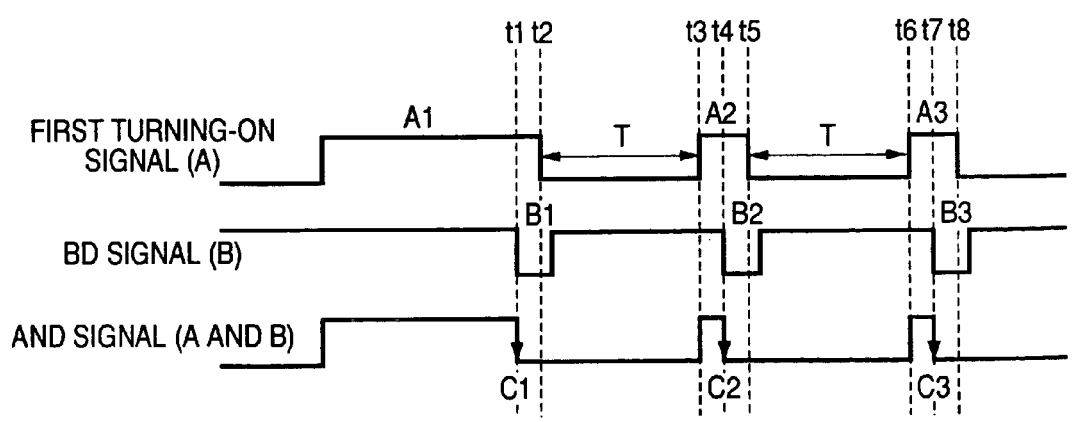
FIG. 8 is a timing chart showing the relationship between a tuning-on signal, a BD signal, and a laser light detection signal.

FIG. 7 is an explanatory view schematically showing the configuration for removing noise of the electrical configuration of the laser printer 1. FIG. 8 is a timing chart of the turning-on signal, the BD signal, and the laser light detection signal.

In this aspect, as shown in FIG. 7, a light-emitting section 280 includes a laser diode 101, and a laser diode driver (hereinafter, simply referred to as 'LD driver') 281 having a driving circuit for driving the laser diode 101. The light-emitting section 280 functions as a light-emitting unit. The laser diode 101 is driven on the basis of the turning-on signal input to the light-emitting section 280. As described above, the BD sensor 254 outputs the BD signal B according to the detection of laser light. In this aspect, there is provided a noise removing section 270 for removing noise of the BD signal B.

The noise removing section 270 is so configured as to output the laser light detection signal C (specifically, falling signals C1, C2, C3, and the like falling from the H level to the L level) when the BD signal B from the BD sensor 254 is output within the output period of the turning-on signal for turning on the laser diode 101. That is, in the case where an erroneous BD signal is output, the laser light detection signal C is not output when the turning-on signal is not output. Therefore, it is possible to remove an abnormal BD signal (noise), without using a complicated configuration, and to acquire a highly reliable laser light detection signal.

Specifically, as shown in FIG. 7, there is provided a turning-on signal output section 272 that outputs a first turning-on signal A for laser light detection by the BD sensor 254. The turning-on signal output section 272 functions as a first circuit. The noise removing section 270 is so configured as to output the laser light detection signal C when the BD signal B is output within the output period of the first turning-on signal. In this aspect, the first turning-on signal A for laser light detection by the BD sensor 254 and a second turning-on signal D generated from a print data output section 282 based on data for image formation are input to the light-emitting section 280. The print data output section 282 functions as a second circuit. The noise removing section 270 removes noise based only on the first turning-on signal.

The noise removing section 270 has a logic device 271 having an AND circuit that receives the first turning-on signal A and the BD signal B as input signals and outputs the laser light detection signal C when both the first turning-on signal and the BD signal B become ON signals. The logic device 271 is so configured as to easily output the laser light detection signal C on the basis of the first turning-on signal A and the BD signal B with high accuracy. More specifically, when both the output lines of the first turning-on signal A and the BD signal B are at an H level, the logic device 271 outputs an H level signal. In other cases, the logic device 271 outputs an L level signal. As shown in FIG. 8, when the first turning-on signal A is turned on and then the BD signal is turned on, the laser light detection signal C is output at a timing at which the BD signal is turned on. That is, during the output line of the first turning-on signal A is at the H level, the output line of the BD signal B is changed to the L level, and then the falling signals C1, C2, C3 . . . serving as the laser light detection signals are output from the logic.

The detection signal output section 272 for outputting the first turning-on signal A and the print data output section 282 for outputting the second turning-on signal D are provided separately from each other. The detection signal output section 272 and the print data output section 282 are so configured as to generate two kinds of turning-on signals used for different purposes, respectively. Incidentally, in this aspect, as shown in FIG. 5, the detection signal output section 272 for outputting the first turning-on signal and the print data output section 282 for outputting the second turning-on signal are arranged separately from each other in the ASIC 200.

Further, the LD driver 281 constituting the light-emitting section 280 is provided with a first input terminal P1 for inputting the first turning-on signal A and a second input terminal P2 for inputting the second turning-on signal D. The logic device 271 (AND circuit) constituting the noise removing section 270 is connected between the detection signal output section 272 and the first input terminal P1. That is, of the first turning-on signal A and the second turning-on signal D, only the first turning-on signal A is input to the AND circuit. Therefore, there is no case where the second turning-on signal D for image formation is input to the noise removing section 270, and thus an influence of the second turning-on signal D can be reliably eliminated. As a result, the laser light detection signal C can be obtained based only on the first turning-on signal A with high accuracy.

Further, the detection signal output section 272 is so configured as to receive the BD signal B from the BD sensor 254 and to output the first turning-on signal A according to the input of the BD signal B at regular intervals. For this reason, a reference signal can be obtained without using a CPU (not shown in FIG. 7), and the first turning-on signal A can be output based on the reference signal at regular intervals. Therefore, the load of the CPU can be reduced, and the turning-on signal can be easily and rapidly output, as compared with a case where the turning-on signal is output based on a command from the CPU.

As shown in the timing chart of FIG. 8, the detection signal output section 272 is so configured as to stop the output of the first turning-on signal A (H level signal) according to the input of the BD signal B (L level signal) from the BD sensor 254. Further, with a timing of stopping the output of the first turning-on signal A as a reference timing (in the case of FIG. 8, timing t2, t5, and t8), the detection signal output section 272 restarts the output of the first turning-on signal A after time T, which is shorter than time required until one surface of the polygon mirror 19 crosses an irradiation position by the light-emitting unit, lapses from the reference timing. Therefore, it is possible to easily implement the configuration for outputting the first turning-on signal at about a timing at which laser light is incident on the BD sensor 254.

Next, a control flow from the start of driving the polygon mirror will be described. First, when the polygon motor for driving the polygon mirror starts rotating, as described above, when the polygon motor rotates at the low rotation speed before it reaches a predetermined rotation speed, the signal selector 237 (FIG. 5) is controlled to allow the FG signal to be used. After the polygon motor reaches the predetermined rotation speed, the signal selector 237 is controlled to allow the BD signal to be used. Though not shown in FIG. 5, the selection signal indicative of the change from the FG signal to the BD signal is input from the CPU 230 or the signal selector 237 to the detection signal output section 272. When the selection signal is input to the detection signal output section 272, as shown in FIG. 8, an initial first turning-on signal A (signal A1) for detecting an initial BD signal B is output from the detection signal output section 272. The BD signal B is not input until the laser diode 101 is activated, and thus the initial first turning-on signal A (signal A1) has the output period longer than those of the subsequently output first turning-on signals A (signals A2, A3, and the like). That is, during the period from the start of the laser diode 101 until the initial BD signal B is output, the direction of the polygon mirror cannot be specified. Accordingly, it is difficult to predict at which timing the BD signal B is output. In contrast, according to this configuration, since the initial first turning-on signal A is output longer, the BD signal B is reliably and stably detected. And then, the output periods of the subsequent first turning-on signals are set shorter, and thus noise is effectively removed.

When the BD signal B (in FIG. 8, a BD signal B1) is input to the detection signal output section 272 during the output period of the initial first turning-on signal A (signal A1), at a timing t2 after short time lapses, the output of the first turning-on signal A (H level signal) is stopped. The detection signal output section 272 includes a counter circuit that measures the time T from the timing t2. The time T is prescribed constant time and is set to be shorter than the time required until one surface of the polygon mirror 19 crosses the irradiation position by the light-emitting unit. Next, at a timing t3 after the time T lapses, the next first turning-on signal A (that is, the signal A2) is output. When the next first turning-on signal A (signal A2) is output, laser light is emitted based on that first turning-on signal. At a timing t4 after short time lapses from the timing t3, reflected light is detected by the BD sensor 254, and the BD signal B (L level signal B2) is output. Next, like the initial first turning-on signal A, at the timing t5, the output of the first turning-on signal A is stopped based on the BD signal B2, and the similar processes (the measure of the time T and the restart of the first turning-on signal A (signal A3)) are repeated.

In the meantime, as described above, the logic device 271 constituting the noise removing section 270 has the AND circuit that receives the first turning-on signal A serving as the H level signal and the BD signal B serving as the L level signal as input signals. When both the output lines of the first turning-on signal A and the BD signal B are at the H level, the AND circuit outputs the H level signal. In other cases, the AND circuit outputs the L level signal. Therefore, as shown in FIG. 8, when the first turning-on signal A is turned on (that is, the output line of the first turning-on signal A is at the H level) and the BD signal is turned on (the output line of the BD signal is changed to the L level), the AND signal from the logic device 271 falls at the timing at which the BD signal is turned on. This falling signal serves as the laser light detection signal C. In contrast, when the first turning-on signal A is not output, the laser light detection signal C (falling signal) is not output even if the BD signal B is output. Accordingly, the laser light detection signal C to be output becomes a periodic signal with high accuracy, from which abnormal noise is effectively removed. The laser light detection signal C is input to the polygon motor driving circuit 260 as the periodic signal, from which noise is removed, as shown in FIGS. 5 and 7. The input periodic signal is used for the speed control of the polygon motor 25.

<Second Aspect>

Figure 10A:
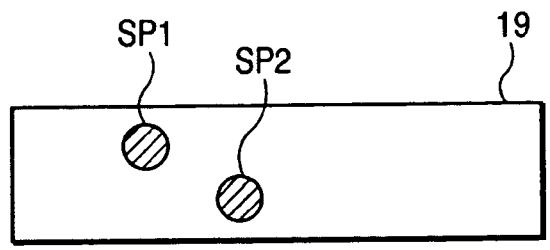
FIGS. 10A to 10C are explanatory views illustrating laser irradiation onto a polygon mirror when two laser diodes are used.
Figure 10B:
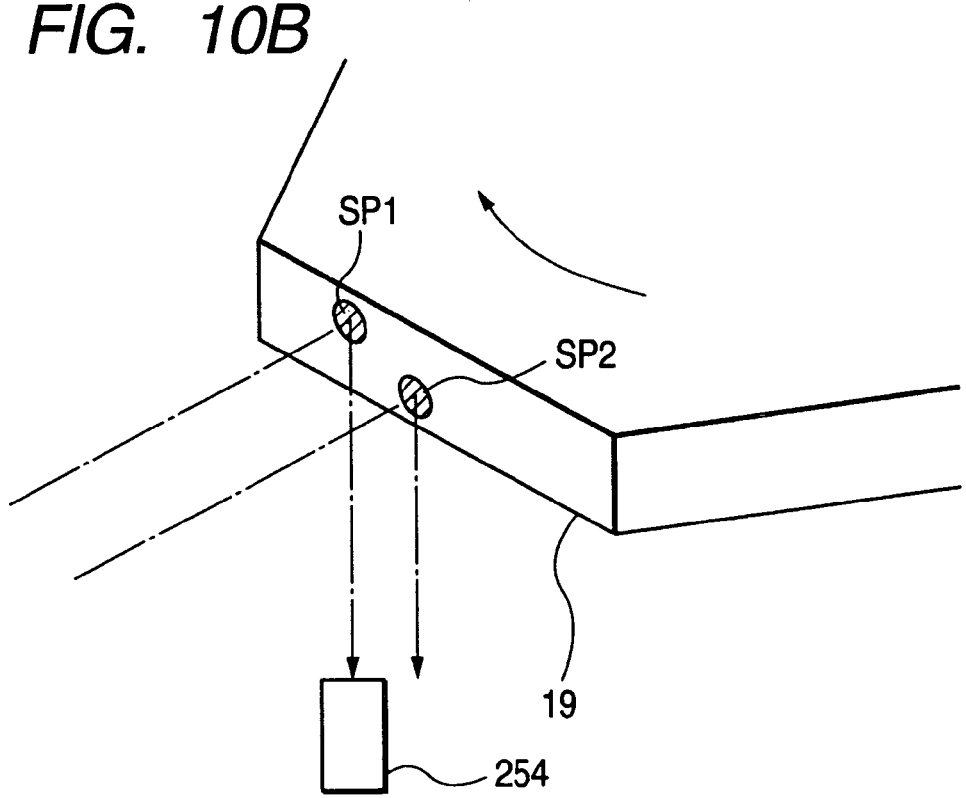
Figure 10C:
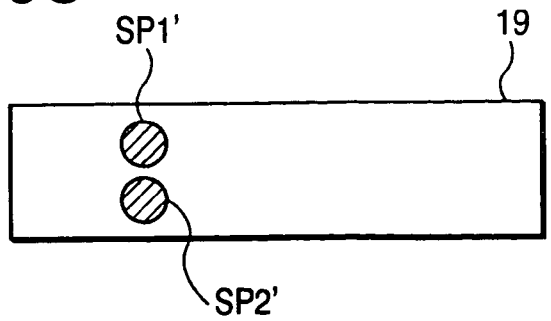
Figure 11:
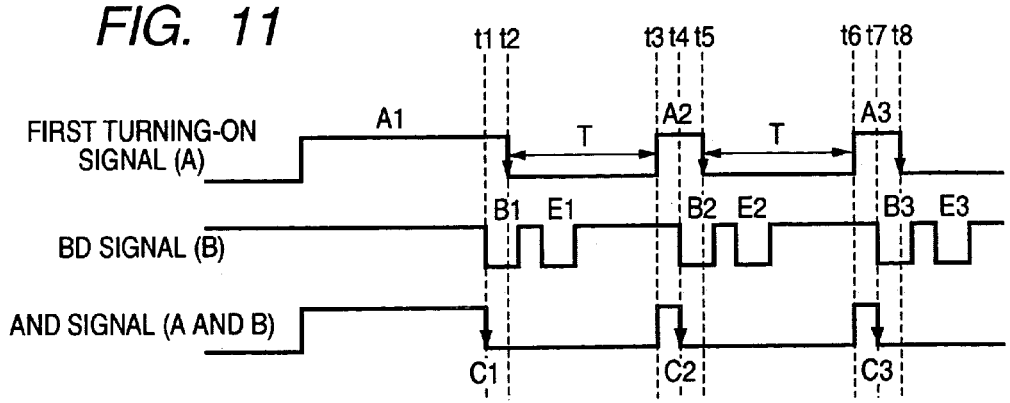
FIG. 11 is a timing chart showing the relationship between a turning-on signal, a BD signal, and a laser light detection signal in the second aspect.

Next, a second aspect will be described with reference to FIGS. 9 to 11.

Figure 9:
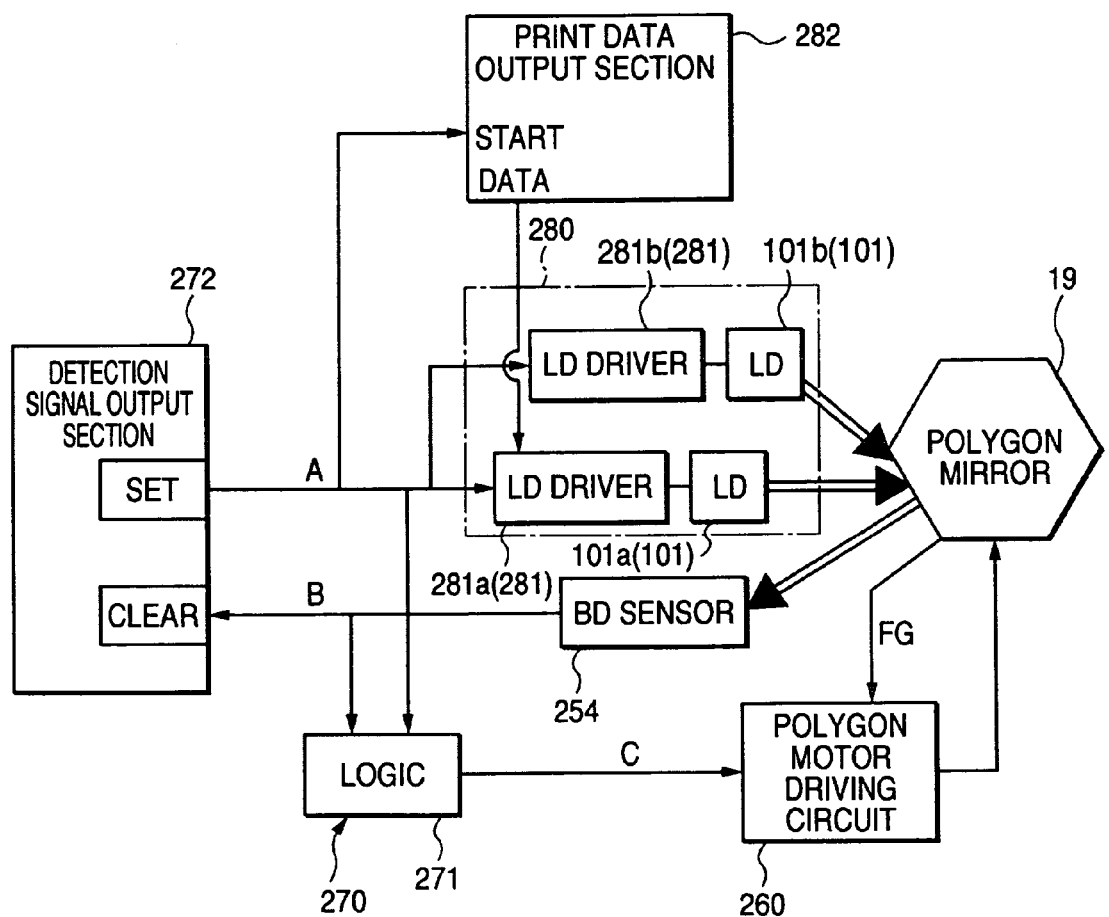
FIG. 9 is an explanatory view illustrating the configuration for removing noise in a second aspect.

FIG. 9 is an explanatory view schematically showing the configuration for removing noise of the electrical configuration of a laser printer according to the second aspect. FIG. 9 shows a modification of FIG. 7. FIGS. 10A to 10C are explanatory views illustrating irradiation using two laser diodes. Specifically, FIG. 10A is a diagram as viewed from a direction perpendicular to the outer surface of the polygon mirror, FIG. 10B is a diagram as viewed in an oblique direction, and FIG. 10C is an explanatory view showing a comparative example. FIG. 11 is a timing chart of the turning-on signal, the BD signal, and the laser light detection signal in the second aspect.

In this aspect, the configurations of a light-emitting section 280 and a print data output section 282 are different from those in the first aspect. Other parts are the same as those in the first aspect. In this aspect, therefore, it is assumed that the parts other than the light-emitting section 280 and the print data output section 282 are the same as those in the first aspect, and the descriptions thereof will be omitted.

The light-emitting section 280 according to this aspect has two laser diodes 101a and 101b, which irradiate laser light onto the same surface of the polygon mirror, respectively. LD drivers 281a and 281b having the same configuration as that in the first aspect are provided for the laser diodes 101a and 101b, respectively, to drive the laser diodes 101a and 101b. FIGS. 10A to 10C illustrate states of spots SP1 and SP2 when laser light is irradiated onto one surface of the polygon mirror from the laser diodes 101a and 101b. The irradiation positions by the laser diodes 101a and 101b are slightly deviated from each other in the rotation direction and the height direction of the polygon mirror 19. Thus, reflected light is incident on the BD sensor at a slightly deviated timing. The output waveform of the BD sensor 254 is as shown in FIG. 11.

Incidentally, like this aspect, in the configuration where two-line irradiation is performed by using the two laser diodes, it is difficult to align the irradiation positions SP1' and SP2' on the polygon mirror with each other in the sub-scanning direction, as shown in FIG. 10C. For example, in order to implement the irradiation as shown in FIG. 10C, when two laser diodes, which emit light in the same direction, are arranged in a row, the laser diodes need to be arranged at a very small pitch, which causes a problem in view of the size. Further, in order to implement the irradiation positions as shown in FIG. 10C, when two laser diodes having different light emission directions are arranged, the angle adjustment and the sensor construction for allowing reflected light from the two laser diodes to be incident on the same BD sensor are difficult. According to this aspect, on the other hand, as shown in FIGS. 10A and 10B, the irradiation positions on the polygon mirror are deviated, and thus it is easy to allow reflected light from a plurality of laser diodes to be incident on a single BD sensor, without using a complicated configuration.

With this configuration, it is possible to implement the configuration that can deal with high-definition or high-speed image formation. Meanwhile, since the rotation position of the polygon mirror detected when light from one laser diode is incident on the BD sensor is different from the rotation position of the polygon mirror detected when light from the other laser diode is incident on the BD sensor, a deviation occurs between input timings of reflected light on the BD sensor. Thus, plural BD signals (BD signals B1, B2, and B3 and BD signals E1, E2, and E3) are output. As a result, the output timing of the BD signal is not determined at regular intervals, and thus it is difficult to monitor the rotation speed based on the BD signal with high accuracy. Therefore, in this aspect, the laser light detection signal C is output according only to laser light from one laser diode 101a of the two laser diodes 101a and 101b by a noise removing section 270.

The configuration that causes the light-emitting section 280 to emit light based on the first turning-on signal A is the same as the flow described with reference to FIG. 8. That is, as shown in the timing chart of FIG. 11, the detection signal output section 272 stops the output of the first turning-on signal A (in this aspect, the H level signal) according to the input of the BD signal B (in this aspect, the L level signal) from the BD sensor 254. Further, with the timing of stopping the output of the first turning-on signal A as the reference timing (in the case of FIG. 11, timing t2, t5, and t8), the detection signal output section 272 is so configured as to restart the output of the first turning-on signal A after the time T, which is shorter than the time required until one surface of the polygon mirror 19 crosses the irradiation position by the light-emitting unit, lapses from the reference timing (that is, in FIG. 11, after timing t3 and t6).

Next, the control flow from the start of driving the polygon mirror will be described. First, when the polygon motor for driving the polygon mirror starts rotating, like the first aspect, when the polygon motor rotates at the low rotation speed before it reaches the predetermined rotation speed, the FG signal is used. After the polygon motor reaches the predetermined rotation speed, the BD signal is used. When the FG signal is changed to the BD signal, as shown in FIG. 11, the initial first turning-on signal (H level signal) A (signal A1) for detecting the initial BD signal (L level signal) B is output from the detection signal output section 272 (FIG. 9). Since the BD signal B is not input until the laser diode is activated, the initial first turning-on signal A (signal A1) has the output period longer than those of the subsequent first turning-on signals A (signals A2, A3, and the like).

When the BD signal B (in FIG. 11, the BD signal B1) is input to the detection signal output section 272 (FIG. 9) during the output period of the initial first turning-on signal A (signal A1), at a timing t2 after short time lapses, the output line of the first turning-on signal A becomes the L level, and then the output of the first turning-on signal A is released. The counter circuit of the detection signal output section 272 measures the time T from the timing t2. The time T is prescribed constant time and, as described above, is set to be shorter than the time required until one surface of the polygon mirror 19 crosses the irradiation position by the light-emitting unit. Next, at a timing t3 after the time T lapses, the output line of the first turning-on signal A becomes the H level, and the output of the next first turning-on signal A (that is, signal A2) restarts. When the next first turning-on signal A (signal A2) is output, laser light is emitted based on that first turning-on signal. At a timing t4 after short time lapses from the timing t3, reflected light is detected by the BD sensor 254, and the BD signal B (B3) is output. Next, like the initial first turning-on signal A, at the timing t5, the output of the first turning-on signal A is released based on the BD signal B3, and the similar processes (the measure of the time T and the restart of the first turning-on signal A (signal A3)) are repeated.

As described above, the logic device 271 constituting the noise removing section 270 has the AND circuit which receives the first turning-on signal A serving as the H level signal and the BD signal B serving as the L level signal as input signals. When both the output lines of the first turning-on signal A and the BD signal B are at the H level, the AND circuit outputs the H level signal. In other cases, the AND circuit outputs the L level signal. Therefore, as shown in FIG. 11, when the first turning-on signal A is turned on (that is, the output line of the first turning-on signal A is at the H level) and the BD signal is turned on (the output line of the BD signal B is changed to the L level), the AND signal from the logic device 271 falls at the timing at which the BD signal is turned on. This falling signal serves as the laser light detection signal C. In contrast, when the first turning-on signal A is not output, the laser light detection signal C (falling signal) is not output even if the BD signal B is output. Accordingly, the laser light detection signal C to be output becomes a periodic signal with high accuracy, from which abnormal noise is effectively removed.

In this aspect, each time the first turning-on signal A is output, that is, for each signal A1, A2, or A3, the BD signal (B1, B2, or B3) based on reflected light of the laser diode 101a and the BD signal (E1, E2, or E3) based on reflected light of the laser diode 101b are output. As described above, provided that the BD signal is input to the detection signal output section 272, the output of the first turning-on signal A is stopped. However, since the BD signal (B1, B2, or B3) is input to the detection signal output section 272 based on reflected light of the laser diode 101a, the output of the first turning-on signal A is stopped by the detection signal output section 272 (timing t2, t5, and t8). The output stop is delivered to the LD drivers 281a and 281b, and thus there is a time lag until the laser diodes 101a and 101b are completely turned off. Therefore, as shown in FIG. 11, in addition to the BD signal (B1, B2, and B3) based on reflected light of the laser diode 101a, the BD signal (E1, E2, and E3) based on reflected light of the laser diode 101b is output.

On the other hand, the output stop of the first turning-on signal A is performed immediately in a minute period according to the input of the BD signal (B1, B2, B3, and . . . ) based on reflected light of the laser diode 101a. The output stop of the first turning-on signal A is performed at the timing t2, t5, or t7 earlier than the output of the BD signal (E1, E2, E3, and . . . ) based on reflected light of the laser diode 101b. Accordingly, the BD signal (E1, E2, and E3) based on reflected light of the laser diode 101b is input to the noise removing section 270 during the time T after the output stop of the first turning-on signal A and thus is removed as a signal. Therefore, the laser light detection signal C can be output according only to the BD signal (B1, B2, B3, and . . . ) based on reflected light of the laser diode 101a and the first turning-on signal A with high accuracy. That is, the output period of the first turning on signal A corresponds to the output period of the BD signal (B1, B2, B3, and . . . ) based on reflected light of the laser diode 101a. Further, the first turning-on signal A is not output in the output period of the BD signal (E1, E2, E3, and . . . ) based on reflected light of the laser diode 101b, thereby removing the signal E1, E2, and E3 with high accuracy. Next, the laser light detection signal C, from which noise is removed, is input to the polygon motor driving circuit 260, and then is used for the speed control of the polygon motor 25, like the first aspect.

Figure 12:
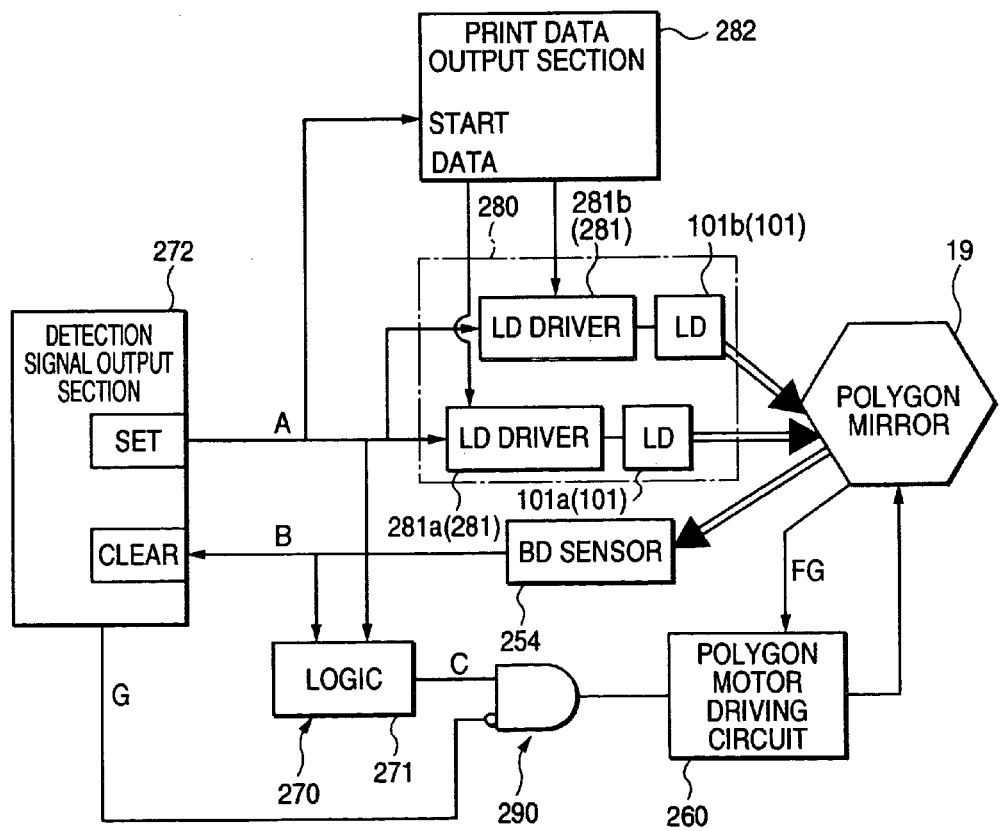
FIG. 12 is an explanatory view showing a modification of FIG. 9.

Moreover, the configuration of FIG. 12, instead of the configuration of FIG. 9, can be used.

Figure 13:
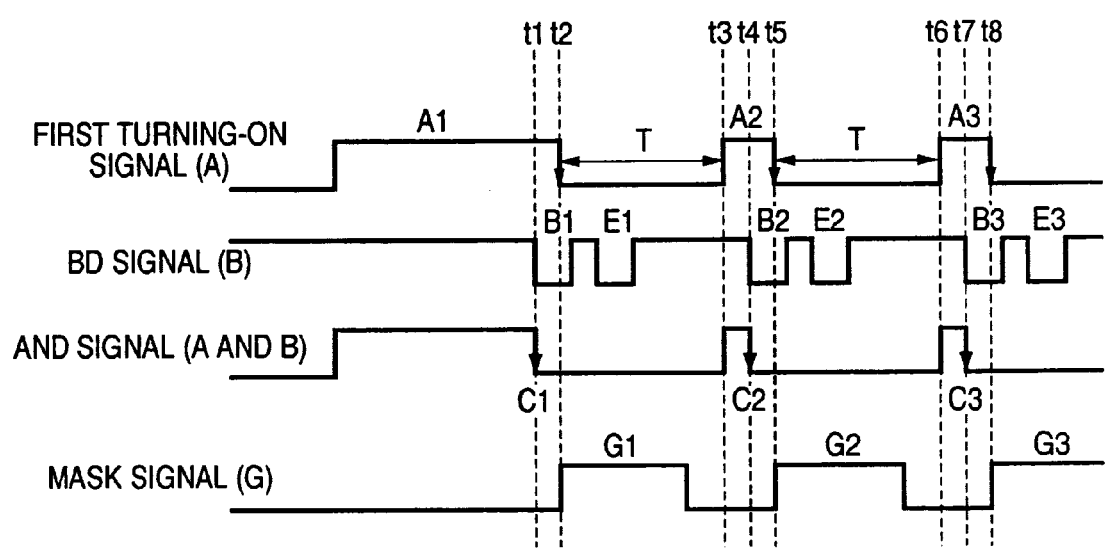
FIG. 13 is a timing chart when the configuration of FIG. 12 is used.

According to the configuration of FIG. 12, as shown in a timing chart of FIG. 13, a mask signal G (signal G1, G2, G3, and . . . ) is output from the detection signal output section 272 according to the input of the BD signal input to the detection signal output section 272. The mask signal G is output at a predetermined period when the output line of the mask signal G is at the L level and the BD signal (here, to which B1, B2, and B3 corresponds) is input. The mask signal G is output during a period shorter than the time T through a counter, and then its output is stopped. A logic device 290 shown in FIG. 12 is so configured as to output the H level signal only when the output line of the mask signal G from the detection signal output section 272 is at the L level and the output from the logic device 271 is at the H level. That is, when the mask signal G is output from the detection signal output section 272, the logic device 290 does not output the signal. Therefore, since the signal is completely cancelled during a predetermined period immediately after each of the BD signal B1, B2, B3, and . . . is output, each of the BD signals E1, E2, E3, and . . . can be effectively removed. Next, the same processes as those in the above-described aspect can be performed based on the signal, from which each of the BD signals E1, E2, and E3 is removed. As a result, the laser light detection signal C (C1, C2, C3, and . . . ), from which noise is effectively removed, is input to the polygon motor driving circuit 260.

<Other Aspects>

The aspects of the invention have been described, but the invention is not limited to the aspects. For example, various modifications can be adopted.

In the above-described aspects, there is described an example where the configuration of the image forming apparatus is applied to the laser printer 1. However, the configuration of the image forming apparatus can be applied to a copy machine, a facsimile machine, or the like as long as it has a function of image formation.

As was described, according to the above-described aspects, the noise removing unit has an AND circuit that receives the turning-on signal and the sensor signal as input signals and outputs the laser light detection signal when both of the turning-on signal and the sensor signal are on signals.

Therefore, noise can be removed effectively with a simple configuration.

Also, the turning-on signal includes a first turning-on signal for laser light detection by the sensor unit and a second turning-on signal generated on the basis of data for image formation. Further, when the sensor signal is output within an output period of the first turning-on signal, the noise removing unit outputs the laser light detection signal.

Thus, the laser light detection signal can be stably obtained based only on the first turning-on signal for laser light detection, without being influenced by the second turning-on signal for image formation.

Further, a first circuit for outputting the first turning-on signal, and a second circuit for outputting the second turning-on signal are provided separately from each other.

Therefore, it is possible to easily implement the configuration that can separately generate two kinds of turning-on signals used for different purposes.

Also, the light-emitting unit has a first input terminal for inputting the first turning-on signal and a second input terminal for inputting the second turning-on signal. Further, the noise removing unit is connected between the first circuit and the first input terminal and is configured to receive only the first turning-on signal from the first turning-on signal and the second turning-on signal.

Thus, there is no case where the second turning-on signal for image formation is input to the noise removing unit, and thus an influence of the second turning-on signal can be reliably eliminated. As a result, the laser light detection signal can be obtained based only on the first turning-on signal with high accuracy.

Further, the first circuit is so configured as to receive the sensor signal from the sensor unit and to output the first turning-on signal according to the input of the sensor signal at regular intervals.

Therefore, a reference signal can be obtained without using a CPU, and the first turning-on signal can be output based on the reference signal at regular intervals. Therefore, the load of the CPU can be reduced, and the turning-on signal can be easily and rapidly output, as compared with a case where the turning-on signal is output based on a command from the CPU.

Furthermore, the first circuit is configured to stop the output of the first turning-on signal on the basis of the input of the sensor signal from the sensor unit, and, with a timing of releasing the output of the first turning-on signal as a reference timing, to restart the output of the first turning-on signal after time T, which is shorter than time required until one surface of the polygon mirror crosses an irradiation position by the light-emitting unit, lapses from the reference timing.

Thus, it is possible to easily implement the configuration that can output the first turning-on signal at about a timing at which laser light is incident to the sensor unit.

Further, an initial turning-on signal, which detects an initial sensor signal after a polygon motor for driving the polygon mirror starts to rotate, has the output period longer than those of subsequent turning-on signals.

Since the direction of the polygon mirror cannot be specified until the initial sensor signal is output, it is difficult to predict at which timing the sensor signal is output. In contrast, according to the above-described aspect, since the initial first turning-on signal is output longer, the sensor signal is reliably and stably detected. Further, the output periods of the subsequent first turning-on signals are set shorter, and thus noise is effectively removed.

Also, the light-emitting unit has a plurality of laser light irradiating units that irradiate laser light onto the same surface of the polygon mirror. Further, the noise removing unit outputs the laser light detection signal about only laser light of one laser light irradiating unit of the plurality of laser light irradiating units.

When the plurality of laser light irradiating units are provided, it is possible to easily deal with high-definition image formation. In this case, however, plural kinds of sensor signals are output, which causes a trouble in monitoring the rotation speed with high accuracy. In contrast, according to the above-described aspect, the laser light detection signal based on laser light from one laser light irradiating unit is obtained with high accuracy. Therefore, it is possible to monitor the rotation speed with high accuracy while using a plurality of laser light irradiating units.

Further, the driving control of a polygon motor for driving the polygon mirror is performed on the basis of an output timing of the laser light detection signal.

Therefore, it is possible to implement control of the polygon motor with high accuracy.

What is claimed is:

1. An optical scanning device comprising:
   a light-emitting unit that emits laser light to a polygon mirror on the basis of a turning-on signal;
   a sensor unit that detects laser light reflected by the polygon mirror and outputs a sensor signal; and
   a noise removing unit that outputs a laser light detection signal when the sensor signal is output during an output period of the turning-on signal, wherein an initial turning-on signal, which detects an initial sensor signal after a polygon motor for driving the polygon mirror starts to rotate, has an output period longer than those of subsequent turning-on signals.

2. The optical scanning device according to claim 1, wherein the noise removing unit comprises an AND circuit that receives the turning-on signal and the sensor signal and outputs the laser light detection signal when both of the turning-on signal and the sensor signal are on-signals.

3. The optical scanning device according to claim 1, wherein the turning-on signal includes a first turning-on signal for laser light detection by the sensor unit and a second turning-on signal generated on the basis of data for image formation, and
   when the sensor signal is output within an output period of the first turning-on signal, the noise removing unit outputs the laser light detection signal.

4. The optical scanning device according to claim 3, farther comprising:
   a first circuit that outputs the first turning-on signal; and
   a second circuit that outputs the second turning-on signal, the second circuit being provided separately from the first circuit.

5. The optical scanning device according to claim 4, wherein the light-emitting unit comprises a first input terminal for inputting the first turning-on signal, and a second input terminal for inputting the second turning-on signal, and
   the noise removing unit is connected between the first circuit and the first input terminal and receives only the first turning-on signal.

6. The optical scanning device according to claim 4, wherein the first circuit receives the sensor signal from the sensor unit and outputs the first turning-on signal according to the input of the sensor signal at regular intervals.

7. The optical scanning device according to claim 1, wherein the light-emitting unit comprises a plurality of laser light irradiating units that irradiate laser light onto the same surface of the polygon mirror, and
   the noise removing unit outputs the laser light detection signal about only laser light of one laser light irradiating unit of the plurality of laser light irradiating units.

8. The optical scanning device according to claim 1, wherein driving control of a polygon motor for driving the polygon mirror is performed on the basis of an output timing of the laser light detection signal.

9. An optical scanning device comprising:
   a light-emitting unit that emits laser light to a polygon mirror on a basis of a turning-on signal;
   a sensor unit that detects laser light reflected by the polygon mirror and outputs a sensor signal;
   a noise removing unit that outputs a laser light detection signal when the sensor signal is output during an output period of the turning-on signal;
   a first circuit that outputs the first turning-on signal; and
   a second circuit that outputs the second turning-on signal, the second circuit being provided separately from the first circuit, wherein the turning-on signal comprises a first turning-on signal for laser light detection by the sensor unit, and a second turning-on signal generated on the basis of data for image formation, and wherein when the sensor signal is output within an output period of the first turning-on signal, the noise removing unit outputs the laser light detection signal, and the first circuit receives the sensor signal from the sensor unit and outputs the first turning-on signal according to the input of the sensor signal at regular intervals, and wherein the first circuit stops the output of the first turning-on signal on the basis of the input of the sensor signal from the sensor unit, and, with a timing of stopping the output of the first turning-on signal as a reference timing, restarts the output of the first turning-on signal after time T, which is shorter than time required until one surface of the polygon mirror crosses an irradiation position by the light-emitting unit, lapses from the reference timing.

10. An image forming apparatus comprising:
an optical scanning device that comprises:
a light-emitting unit that emits laser light to a polygon mirror on the basis of a turning-on signal;
a sensor unit that detects laser light reflected by the polygon mirror and outputs a sensor signal; and
a noise removing unit that outputs a laser light detection signal when the sensor signal is output during an output period of the turning-on signal, wherein an initial turning-on signal, which detects an initial sensor signal after a polygon motor for driving the polygon mirror starts to rotate, has an output period longer than those of subsequent turning-on signals.

11. The image forming apparatus according to claim 10, wherein the noise removing unit comprises an AND circuit that receives the turning-on signal and the sensor signal and outputs the laser light detection signal when both of the turning-on signal and the sensor signal are on-signals.

12. The image forming apparatus according to claim 10, wherein the turning-on signal includes a first turning-on signal for laser light detection by the sensor unit and a second turning-on signal generated on the basis of data for image formation, and
when the sensor signal is output within an output period of the first turning-on signal, the noise removing unit outputs the laser light detection signal.

13. The image forming apparatus according to claim 12, farther comprising:
a first circuit that outputs the first turning-on signal; and
a second circuit that outputs the second turning-on signal, the second circuit being provided separately from the first circuit.

14. The image forming apparatus according to claim 13, wherein the light-emitting unit comprises a first input terminal for inputting the first turning-on signal, and a second input terminal for inputting the second turning-on signal, and the noise removing unit is connected between the first circuit and the first input terminal and receives only the first turning-on signal from the first turning-on signal and the second turning-on signal.

15. The image forming apparatus according to claim 13, wherein the first circuit receives the sensor signal from the sensor unit and outputs the first turning-on signal according to the input of the sensor signal at regular intervals.

16. The image forming apparatus according to claim 10, wherein the light-emitting unit comprises a plurality of laser light irradiating units that irradiate laser light onto the same surface of the polygon mirror, and
the noise removing unit outputs the laser light detection signal about only laser light of one laser light irradiating unit of the plurality of laser light irradiating units.

17. The image forming apparatus according to claim 10, wherein driving control of a polygon motor for driving the polygon mirror is performed on the basis of an output timing of the laser light detection signal.

18. An image forming apparatus comprising:
an optical scanning device, the optical scanning device comprising:
a light-emitting unit that emits laser light to a polygon mirror on a basis of a turning-on signal;
a sensor unit that detects laser light reflected by the polygon mirror and outputs a sensor signal;
a noise removing unit that outputs a laser light detection signal when the sensor signal is output during an output period of the turning-on signal;
a first circuit that outputs the first turning-on signal; and
a second circuit that outputs the second turning-on signal, the second circuit being provided separately from the first circuit,
wherein the turning-on signal comprises a first turning-on signal for laser light detection by the sensor unit, and a second turning-on signal generated on the basis of data for image formation, and
wherein when the sensor signal is output within an output period of the first turning-on signal, the noise removing unit outputs the laser light detection signal, and the first circuit receives the sensor signal from the sensor unit and outputs the first turning-on signal according to the input of the sensor signal at regular intervals,
and wherein the first circuit stops the output of the first turning-on signal on the basis of the input of the sensor signal from the sensor unit, and, with a timing of stopping the output of the first turning-on signal as a reference timing, restarts the output of the first turning-on signal after time T, which is shorter than time required until one surface of the polygon mirror crosses an irradiation position by the light-emitting unit, lapses from the reference timing.

* * * * *